United States Patent [19]
Rogers et al.

[11] Patent Number: 5,389,586
[45] Date of Patent: Feb. 14, 1995

[54] PRESSURELESS SINTERING OF WHISKER REINFORCED COMPOSITES

[75] Inventors: William M. Rogers, Taylors; James F. Rhodes, Greer, both of S.C.

[73] Assignee: Advanced Composite Materials Corporation, Greer, S.C.

[21] Appl. No.: 232,842

[22] Filed: Apr. 21, 1994

Related U.S. Application Data

[63] Continuation of Ser. No. 922,763, Jul. 31, 1992, abandoned, which is a continuation-in-part of Ser. No. 801,854, Dec. 3, 1991, abandoned.

[51] Int. Cl.$^6$ .................................. C04B 35/76
[52] U.S. Cl. .................................. 501/87; 501/89; 501/95; 501/96; 501/97; 264/65
[58] Field of Search ............... 501/95, 96, 97, 89, 501/153, 92, 94, 87; 264/65, 36

[56] References Cited

U.S. PATENT DOCUMENTS

| | | | |
|---|---|---|---|
| 2,979,414 | 4/1961 | Ryshkewitch et al. | |
| 3,562,371 | 2/1971 | Bush | 264/65 |
| 3,886,254 | 5/1975 | Tanaka et al. | |
| 3,903,230 | 9/1975 | Kamigaito et al. | 264/122 |
| 4,010,233 | 3/1977 | Winter et al. | |
| 4,071,371 | 1/1978 | Milberg et al. | |
| 4,104,782 | 8/1978 | Veck et al. | |
| 4,108,652 | 8/1978 | Ogawa et al. | 75/223 |
| 4,152,223 | 5/1979 | Wallace et al. | |
| 4,184,884 | 1/1980 | Jong | 264/65 |
| 4,199,339 | 4/1980 | Grunke | 65/18 |
| 4,218,253 | 8/1980 | Dworak et al. | |
| 4,230,745 | 10/1990 | Betz et al. | 427/344 |
| 4,242,294 | 12/1980 | Huther et al. | 264/62 |
| 4,250,610 | 2/1981 | Wilbers et al. | |
| 4,280,973 | 7/1981 | Moskowitz et al. | |
| 4,543,345 | 9/1985 | Wei | 501/95 |
| 4,652,413 | 3/1987 | Tiegs | 501/89 |
| 4,657,877 | 4/1987 | Becher et al. | |
| 4,745,091 | 5/1988 | Landingham | 501/95 |
| 4,746,635 | 5/1988 | Inoue et al. | |
| 4,774,209 | 9/1988 | Gadkaree et al. | |
| 4,789,277 | 12/1988 | Rhodes et al. | |
| 4,820,663 | 4/1989 | Mehrotra et al. | |
| 4,946,808 | 8/1990 | Wei et al. | 501/95 |
| 4,956,315 | 8/1989 | Mehrotra et al. | |
| 4,961,757 | 10/1990 | Rhodes et al. | |
| 5,009,822 | 3/1991 | Sacks et al. | 264/65 |
| 5,053,363 | 10/1991 | Brandt | |
| 5,095,730 | 3/1992 | Lauder | 72/347 |
| 5,207,958 | 5/1993 | Tiegs | 264/65 |

FOREIGN PATENT DOCUMENTS

| | | |
|---|---|---|
| 63-112471 | 5/1988 | European Pat. Off. |
| 86-005480 | 9/1986 | WIPO |
| 8605480 | 9/1986 | WIPO |

OTHER PUBLICATIONS

Barclay et al., "Processing of Pressureless Sintered SiC Whisker Reinforced Alumina Composites", *J. Mater. Sci.*, 22, pp. 4403–4406 (Dec. 1987).

ORNL, "Ceramic Technology for Advanced Heat Engines Project Semiannual Progress Report for Apr. 1987 through Sep. 1987", ORNY/TM-10705, pp. 89–94 (Apr. 20, 1988).

Becher et al., "Temperature Dependence of Strengthening by Whisker Reinforcement: SiC Whisker Reinforced Alumina in Air", *Adv. Ceram. Mat.*, 3(2), p. 148 (Mar. 1988).

(List continued on next page.)

*Primary Examiner*—Mark L. Bell
*Assistant Examiner*—Paul Marcantoni
*Attorney, Agent, or Firm*—Banner, Birch, McKie & Beckett

[57] ABSTRACT

A composite and pressureless sintering process for making whisker-reinforced alumina composites using about 2 to about 7.5 wt. % of a nitride modifier consisting essentially of silicon nitride, aluminum nitride, or mixtures thereof produces a sintered body having a density of greater than about 95% theoretical.

27 Claims, 1 Drawing Sheet

OTHER PUBLICATIONS

Hoffman et al., "Slip Casting of SiC Whisker Reinforced $Si_3N_4$", *J. Am. Ceram. Soc.*, 72(5), pp. 765–769 (May 1989).

Hsueh, "Sintering of Whisker-Reinforced Ceramic and Glasses", *J. Amer. Ceram. Soc.*, 71(10), pp. C-442–C-444 (Oct. 1988).

Kandori et al., "SiC Whisker Reinforced $Si_3N_4$ Composites", *J. Mat. Sci. Ltrs.*, 6(11), pp. 1356–1358 (Nov. 1987).

Kim et al., "Pressureless Sintering of $Al_2O_3$—SiC Whisker Composites", *J. Mat. Sci.*, 26, pp. 1316–1321 (1991), no month.

Lange et al., "Constrained Network Model for Predicting Densification Behavior of Composite Powders", *J. Mat. Res.*, 2(1), p. 6 (Jan. 1987).

Lundberg et al., "SiC Whisker Reinforced $Si_3N_4$ Composites", *Am. Cer. Soc. Bull.*, 66(2), pp. 330–332 (1987), no month.

Sacks et al., "Suspension Processing of $Al_2O_3$/SiC Whisker Composites", *J. Am. Cer. Soc.*, 71(5), pp. 370–379 (May 1988).

Sacks et al., "Pressureless Sintering of SiC Whisker Reinforced Composites", *Cer. Eng. Sci. Proc.*, 9(7–8), pp. 741–754 (1988), no month.

Shalek et al., "Hot Pressed SiC Whisker/$Si_3N_4$ Matrix Composite", *Am. Cer. Soc. Bull.*, 65(2), p. 351 (1986), no month.

Tiegs et al., "Sintered $Al_2O_3$—SiC-Whisker Composites", *Am. Ceram. Soc. Bull.*, 66(2), pp. 339–342 (1987), no month.

Tiegs et al., "Alumina-SiC Whisker Composites", *Ceram. Eng. and Sic. Proc.*, pp. 1182–1186 (Sep. 1986).

Tiegs et al., "Thermal Shock Behavior of an Alumina-SiC Whisker Composite", *J. Am. Cer. Soc.*, 70(5), p. 301 (May 1987).

"Processing of Pressureless-Sintered SiC Whisker-Reinforced $Al_2O_3$ Composites" S. J. Barclay, J. R. Fox, H. K. Bowen, J. of Materials Science, 22, pp. 4403–4406 (Dec. 1987).

"Suspension Processing of $Al_2O_3$/SiC Whisker Composites" M. D. Sacks, Hae-Weon Lee, and Oswaldo E. Rojas, J. Am. Ceram. Soc., 71 [5] 370–79.

"Pressureless Sintering of SiC Whisker-Reinforced Composites" M. D. Sacks, H. W. Lee, and O. E. Rojas, Ceram. Eng. Sci. Proc., 9[7–9], pp. 741–754 (Jul. 1988).

"Pressureless Sintering of Alumina Matrix Composites" Ornl., Apr. 20, 1988.

PRESSURELESS SINTERING OF WHISKER REINFORCED COMPOSITES

This application is a continuation of application Ser. No. 07/922,763, filed on Jul. 31, 1992, now abandoned, which is a continuation-in-part of application Ser. No. 07/801,854, filed on Dec. 3, 1991, now abandoned.

FIELD OF THE INVENTION

The invention relates to a process for forming whisker-reinforced alumina-based ceramic bodies having excellent physical properties with pressureless sintering.

BACKGROUND OF THE TECHNOLOGY

Whisker-reinforced alumina has found use in structural applications such as heat engines and turbine blades (see, U.S. Pat. No. 4,543,345) and in more severe applications such as cutting tools (see, U.S. Pat. Nos. 4,789,277 and 4,961,757). These composites can have up to about 40 vol. % whiskers using a processing technique known as "hot pressing" which produces composites having a density of at least greater than 98% of theoretical. A density of at least 95% is needed for virtually all ceramic engineering applications.

In the conventional processes for making whisker-reinforced alumina bodies, hot pressing can also be described as "pressurized sintering" because the process involves the application of uniaxial loads of about 3500–5500 psi. In the process, a powder blend or preformed sample is loaded in a free flowing form into a graphite die and sintered under an inert atmosphere in a high temperature furnace. Pressure is applied to the powder in the die with a hydraulic ram as the furnace temperature is increased to about 1450°–1850° C. and maintained at temperature for an appropriate time. The furnace is then allowed to cool. Cycle times of several hours are used, and the process is limited to the production of discrete batches.

The structural limits of the dies generally prohibit the use of applied pressures greater than about 5500 psi. In addition, the hot pressing method generally limits the shape of the formed body to simple geometric shapes such as round or rectangular plates or cylinders unless special complex dies and pressure rams are constructed at great expense. In addition, the properties of such hot pressed bodies are more anisotropic due to the uniaxial loading than those prepared by the pressureless sintering.

Hot pressing is to be contrasted with "green" preform body preparation, "pressureless sintering" and "hot isostatic pressing" (HIPing). Green preform bodies are prepared by mixing ceramic powder blends with conventional sintering aids (e.g., magnesia and/or rare earth oxides) and an organic binder containing a lubricant. The green preform body is then formed by compacting the powder blend at ambient temperature to a density of about 60–70% of theoretical. The theoretical density of a material is the density calculated from the number of atoms per unit cell and the measurement of the lattice parameters. Generally, green bodies are formed as simple geometrical shapes (e.g., a tube, cylinder, or disk) and machined to the desired shape allowing for shrinkage which will occur during subsequent heating steps (i.e., near-net-shape fabrication). Binder material is removed by heating the shaped green body in an oven at about 500° C. for about 10–15 hours depending on size and shape.

A green preform body is further densified by pressureless sintering in a furnace at 1450°–1850° C. under an inert atmosphere (e.g., argon or nitrogen). The sintering is allowed to continue until essentially complete (generally greater than 94% theoretical density). If the resulting sintered body forms a closed cell structure (closed porosity), the density may be further increased by hot isostatic pressing.

Hot isostatic pressing (HIPing) is the process of applying high pressure to a sintered body with inert gas typically at 15,000–30,000 psi for about 1–2 hours at a temperature of from about 1500° to about 1700° C. with the goal of producing a body having greater than about 98% theoretical density. The sintered body to be HIPed must exhibit almost completely closed cell structure. More than about 95% of the pores must be closed for HIPing to have a significant effect.

The concentration of closed pore structure is calculated from the formula:

$$(\% \text{ Closed}) = 100 - (\% \text{ Theoretical density}) - (\% \text{ Open Porosity})$$

The method used for measuring the closed porosity is ASTM C830-83. Briefly described, the open pore structure is determined by measuring water uptake during vacuum impregnation of the body. As an example, if a dry sintered body with a density of 95% theoretical density has a water uptake corresponding to 1% of the alumina composite density, then the body has a 4% closed pore structure. The theoretical density is calculated by applying the rule of mixtures to the absolute densities of each component, as is well known in the art.

Economically, hot pressing is an extremely expensive and labor intensive process. The pressing equipment is costly. The graphite dies must be cut from a unitary block and do not last for many pressings. The cycle times are relatively short, but can only produce a limited number of specimens. The pressed bodies are limited to simple geometric shapes. The machining of such shapes to final form is difficult due to the high density and hardness of the body and can lead to rejects or surface stresses that affect the structural performance of the part. See, Sacks U.S. Pat. No. 5,009,822.

By contrast, pressureless sintering is about 25–33% the cost of hot pressing. Conducting the process at about atmospheric pressure reduces the capital expense of the equipment needed for the process. Continuous processing can be used, and large numbers of parts can be made. If a batch process is used, the batches are larger and the furnaces can be used more economically. Metal dies used for green forming can be reused for many samples. The ability to readily machine the green body permits the formation of complex shapes. If needed, HIPing can be used after pressureless sintering to increase the final density of the body at a total cost that is still less than the corresponding hot pressing process (i.e., perhaps 30% less) but without the inherent limits imposed by hot pressing.

Pressureless sintering would, therefore, be a preferred form for making ceramic bodies and for whisker reinforced ceramics in particular. Unfortunately, those in the art have found that pressureless sintering does not produce adequate densities when the composite contains more than 10 vol. % (about 8.1 wt. %) whiskers. See, Tiegs U.S. Pat. No. 4,652,413 where an alumina matrix containing 2% yttria as a sintering aid and 10 vol % silicon carbide whiskers was sintered by pressureless sintering to greater than 94% theoretical, but an equivalent sample with 20 vol % (about 16.7 wt. %) whiskers could achieve only 75% theoretical density. This limitation of about 10 vol % whiskers is also described in Sacks U.S. Pat. No. 5,009,822 in col. 7, lines 4–12.

A review of the problems associated with pressureless sintering of alumina-SiC whisker composites is presented in Tiegs et at., *A. Ceram. Soc. Bull.*, 66(2) 339–342 (1977). As described on page 340, the whiskers interfere with efficient particle packing, particle rearrangement, and shrinkage. The result is a low final density. Table II and FIG. 2 in Tiegs show that as the whisker content increases, the green and final densities decrease. Tiegs et al. states: "At whisker contents much greater than 10 vol %, the inhibition of densification is acute." Moreover, HIPing was not able to increase the density of the body because "the material had not achieved closed porosity prior to HIPing." The fracture toughness for the 20 vol % whisker material was reported as not significantly higher than monolithic alumina.

In a later paper, Tiegs et at. achieved a 95% density with pressureless sintering of an alumina composite containing about 13 vol % (about 10.7 wt.%) whiskers. *Ceram Engr. and Sci. Proc.*, September–October 1986, pp. 1182–1186, FIG. 2. The paper also summarizes the need in the art: "Further development may make it possible to sinter and then HIP (without encapsulation) alumina with up to 20 vol. % SiC whiskers, but that is yet to be shown."

The art has gone to great lengths to find a process that would produce a whisker-reinforced alumina composite with a density of at least 94% theoretical. Techniques used to increase density include dry processing of powders with pressureless sintering and HIPing (see, Tiegs et al., *Ceram. Engr. and Sci. Proc.*, 13th Automotive Conf., pp. 1182–1186 (September–October 1986)) and wet processing with size classification to remove agglomerates followed by slip and centrifugal casting of well dispersed suspensions of alumina and whiskers (see, Sacks et at., *J. Am. Ceram. Soc.*, 71(5) 370–379 (1988)). These wet processing methods are considered to produce superior green bodies compared to dry powder processing. See, Sacks et al. in Table III. Wet processing techniques can be used to produce green bodies having high densities with even 30 vol % whiskers because green body density is not significantly affected by whisker size and concentration. Compare Sacks et al., *J. Am. Ceram. Soc.*, 71(5) 370–379 (1988) with Tiegs et al., *Ceram Engr. and Sci. Proc.*, (September–October 1986) in FIG. 2. Upon sintering, however, the whiskers exert a controlling influence over the densities which can be attained by sintering green bodies made by either dry or wet processing.

The need continues to exist for a pressureless sintering process that will permit the use of high levels of whiskers as reinforcing agents for alumina matrices and result in a sufficiently high density with a sufficient degree of pore closure to permit HIPing the body to further increase both the density and strength of the ceramic to the level required by the intended application.

One skilled in the art will recognize that the application and purpose for which the reinforced ceramic is to be used will dictate the minimum density and strength that is required. Different applications and end uses will require different minimum densities and strengths. For example, a metal cutting tool insert with 15 wt. % whiskers requires a density of greater than 98% theoretical. A router bit of the same composition, designed for cutting non-metals such as wood, requires a density of greater than 96.5% theoretical. Thus, depending on the composition of the ceramic, its application, and end use, HIPing after pressureless sintering may or may not be required. The identification of the requirements for each use is within the skill of the art.

The art has also suggested the use of high levels, e.g. greater than 8 wt.%, of sintering aids to increase the composite density. The resulting liquid phase may, however, affect the composite's high temperature properties. Sacks et at., *Ceram. Engr. Soc. Proc.*, 9 [7–8], pp. 741–754 (1988). It would be desirable to have a process that could produce high densities without the need for high levels of sintering aids which adversely affect properties of the composite.

In addition to a high density and closed pores, the final composite should exhibit high levels of toughness. One method for increasing the toughness of a reinforced alumina composite is described in Landingham U.S. Pat. No. 4,745,091. The disclosed method includes hot pressing an alumina composite containing reinforcing particles, magnesia (as a sintering aid), zirconia or hafnia (for toughness and shock resistance), and 0.1–15 wt. % of a nitride modifier. Reaction hot pressing is preferred to avoid the need for a preliminary step to pre-react the powders so as to form a second nitride phase (identified as "SiAlOX") uniformly dispersed in the matrix. See, col. 3, lines 6–9; col. 4, lines 30–38; and FIG. 3. If the powders are pre-reacted, the patent discloses that cold pressing and sintering can be used. The examples illustrate the use of a total nitride modifier concentration of 9–30 wt. % with hot pressing fabrication. The problem of achieving high compaction densities with high whisker concentrations is not disclosed, acknowledged, nor exemplified.

It would be desirable to provide a pressureless sintering process that could produce whisker-reinforced alumina composites exhibiting levels of toughness comparable in use to those of reinforced alumina composites made by hot pressing.

SUMMARY OF THE INVENTION

It is an object of the invention to provide a process for preparing whisker reinforced alumina composites by pressureless sintering whereby the sintered body exhibits a high density and sufficient closed pores to permit the body to be HIPed to a density of at least about 98% theoretical.

It is another object of the invention to provide a process for preparing whisker reinforced alumina composites by pressureless sintering whereby the sintered body exhibits a toughness comparable in practical use to those of reinforced alumina composites made by hot pressing.

These and other objects that will become apparent from the description herein.

A process according to the invention comprises:

sintering at ambient pressures a preform body having a density within the range from about 60% to about 70% theoretical and made from a mixture comprising a matrix material consisting essentially of alumina and up to about 4% of sintering aids, from about 10 to about 20 wt. % monocrystalline whiskers, and from about 2 to about 7.5 wt. % of nitride modifier consisting essentially of silicon nitride or aluminum nitride or mixtures thereof, to provide a sintered ceramic composite which exhibits a density of at least about 95% of theoretical and a sufficiently high density and concentration of closed pores that will permit the body to attain a density of at least about 98% theoretical upon hot isostatic pressing.

Another aspect of the invention is a sintered ceramic composite comprising a matrix material consisting essentially of alumina and up to about 4% of sintering aids, from about 10 to about 20 wt. % monocrystalline whiskers, and from about 2 to about 7.5 wt. % of nitride modifier consisting essentially of silicon nitride or aluminum nitride or mixtures thereof, wherein said sintered ceramic composite exhibits a density of at least about 95% of theoretical, and at least about 95% of the pores of said composite are closed.

In still other aspects, the invention contemplates cutting tools and can-making tools made by a pressureless sintering process.

The present invention provides a process for consistently producing dense, tough ceramic composites using a significantly more economic procedure than the conventional hot pressing. The properties of ceramics from the present process are comparable in practical use to those made by hot pressing.

DETAILED DESCRIPTION

The process of the present invention comprises sintering at ambient pressures a green preform body made from a mixture comprising a matrix consisting essentially of alumina and up to about 4% of sintering aids, about 10–20 wt.% monocrystalline whiskers, and about 2 to about 7.5 wt.% of nitride modifier consisting essentially of silicon nitride or aluminum nitride or mixtures thereof. The resulting composite exhibits a density of at least about 95% theoretical and preferably greater than 95% of a closed pore structure. The closed pore structure permits further compaction by HIPing to a density of greater than about 98% theoretical if such additional densities are required for the intended application. Composites according to the invention exhibit a fracture toughness of greater than about 5 Mpa$\sqrt{m}$, and a bending strength of greater than about 500 Mpa after HIPing to provide the properties suggestive of utility for a number of applications for the composites. Fracture toughness is measured according to G. R. Anstis et al., Gen. Am. Ceram. Soc., 64, p. 553 (1981) employing a 10 kg load, and bending strength is measured according to MS 1942B.

Alumina useful for the matrix material of the present invention is $\alpha$-alumina having a high degree of purity. Preferably, the alumina used in the process has an average particle size from about 0.5 $\mu$m to about 1 $\mu$m and represents at least about 60% of the total weight of the final composite.

Sintering aids for the present invention are known in the art and are used in concentrations up to about 4 wt. %, preferably only up to about 2 wt. % a sintering aid acts to increase the efficiency of the sintering process without materially affecting the reinforcing effects of the whiskers in the matrix. Preferred sintering aids include at least one sintering aid of, inter alia, magnesia, yttria, and other rare earth oxides. Nitride modifiers such as silicon nitride and aluminum nitride according to the present invention are generally not considered to be sintering aids. See U.S. Pat. No. 4,745,091 in col. 2, lines 39–68.

The matrix may contain up to about 30 wt. % of a toughening agent to affect the overall composite toughness. Toughening agents useful in the invention are those oxides generally known in the art such as zirconia and hafnia. The matrix may also contain up to about 10 wt. % of hardening agents such as titanium carbide. The toughening and hardening agents are in the form of particles typically within the size range from about 0.5 to about 1 $\mu$m. Titanium carbide particles, however, may be somewhat larger.

Monocrystalline ceramic whiskers useful in the present invention are present in amounts within the range from about 10 wt. % to about 20 wt. %, and preferably within the range from about 10 to about 18 wt. %. Particularly good results are seen when the composite contains about 10–15 wt. % whiskers.

Whiskers useful in the invention include alumina, titanium carbide, silicon carbide, and mixtures thereof. Each of these whiskers are well known in the art. Silicon carbide whiskers are the preferred whisker and are thoroughly described in U.S. Pat. No. 4,961,757 which is herein incorporated by reference. Briefly stated, silicon carbide whiskers are beta silicon carbide exhibiting a monocrystalline structure. Such whiskers may be produced from rice hulls and have average diameters on the order of 0.6 $\mu$m and aspect ratios on the order of 15–150. Strengths are about 1 million psi (70,000 kg/cm$^2$) with tensile modulii of about 60–100 million psi (4–7 million kg/cm$^2$).

The nitride modifier consists essentially of powdered, fiber, or whisker forms of silicon nitride, aluminum nitride, or mixtures thereof so long as the total nitride content lies within the range from about 2 wt. % to about 7.5 wt. % based on the total composite weight. Preferably, the total nitride modifier is added in a concentration with the range of about 3.5 to about 6 wt. %, most preferably, about 4 to about 5.5 wt. % when 15 wt. % whiskers are used. The optimum nitride modified concentration for a particular whisker concentration is readily determined by one in this art with the exercise of no more than the existing skill level. The preferred nitride modifier consists essentially of silicon nitride. The average particle size range for the nitride modifier or modifiers when used in particulate form is within the same ranges as those for the alumina, preferably about 0.5 $\mu$m to about 1 $\mu$m.

Composites made according to the present invention are made by mixing the alumina, whiskers, and nitride modifier with mixing techniques that thoroughly disperse the whiskers in the matrix material. Ball milling with alumina or ceramic balls is a preferred mixing method. One preferred method involves a combination of wet ball milling, drying the wet milled material to form a cake, and dry ball milling the cake. Choice of apparatus, and optimization of operating conditions and process times are within the skill of the art. For example, wet ball milling times may range from about 2 to about 24 hours, drying may be at temperatures within the range from about 70° C. to about 120° C., and dry ball milling times may range from about 2 to about 24 hours. The specific process is chosen to provide a homogeneous free flowing powder which desirably has a particle size distribution substantially within the range from about −40 Tyler mesh (373 μm) to about +325 Tyler mesh (44 μm). An insufficiently dried or pulverized powder can adversely affect the final product.

The green preform body is made from the thoroughly mixed free-flowing powder. The powder is not pre-reacted or otherwise subjected to chemical reaction processes to form a sialon-type phase before being formed into green preform bodies such as is taught in Landingham U.S. Pat. No. 4,745,091.

Green preform bodies for use in the present process are formed by conventional wet or dry forming methods. Suitable methods include axial pressing at ambient temperatures at pressures within the range from about 10,000 to about 20,000 psi, cold isostatic pressing, extrusion with high back pressures, injection molding, and casting with conventional slip or centrifugal techniques (see, e.g., Sacks U.S. Pat. No. 5,009,822).

The preform bodies exhibit a density within the range from about 60% to about 70% of theoretical maximum and are often made in simple geometric shapes such as cylinders, round or square disks, and tubes. If desired, these preform bodies may be machined by conventional techniques into a shape approximating that of the final product dimensions with appropriate allowance for shrinkage upon sintering.

Pressureless sintering according to the invention is conducted at about ambient pressures in a furnace at a temperature within the range from about 1500° to about 1850° C. under an inert atmosphere (e.g., argon or nitrogen) for a time sufficient to produce a sintered composite having a density of at least about 95%, with a 98–99% theoretical density being a general maximum for pressureless sintering. The pressureless sintered composite has utility for applications which do not require particularly high strength. Such applications include, inter alia, can tools, bearings, routers and drill bits for non-metal and soft metal (e.g., brass) shaping, and the like.

The practice of the invention provides a sintered composite having a high percentage of pores that are closed, generally above about 95%. The percent of closed pores desirably is sufficient to allow the sintered composite to be HIPed to further densify and strengthen the ceramic body. HIPing is conducted employing the standard prior art technique. As one skilled in the art will recognize, the closed pore content can be regulated by adjusting the proportions of the ingredients including the nitride modifier.

Ambient pressures for use in pressureless sintering include the atmospheric conditions prevailing at the manufacturing site although pressures somewhat above and below ambient pressures may be used if desired. Lower pressures may be used to evacuate the sintering chamber. Slightly elevated pressures (e.g., up to a few atmospheres) may also be used to prevent entry of materials or gases from outside the sintering chamber although such elevated pressures generally provide little, if any, benefit to the sintered product. Generally, the sintering cycle time will be about 12–48 hours although those in this art are aware that sintering cycle temperatures and times may be varied depending on the nature and size of the body being sintered.

Although not wishing to be bound by any particular theory, the nitride modifier in levels according to the invention appears to be mitigating the effects which inhibit achieving high composite densities in highly loaded whisker composites made by pressureless sintering. See, Lange, *J. Mater, Rsch.*, 2(1) 59–63 (1987) for a discussion of the factors which inhibit high loading. The nitride modifier may be producing an irreversible transient plastic or liquid phase that permits whiskers otherwise constrained from further movement by frictional forces to compact further.

If the sintering process results in a body having a density of less than about 98%, the sintered preform body may be further compacted by hot isostatic pressing (HIPing) for a time sufficient to produce a compacted body having a density of greater than about 98%. It should be noted that the present invention provides a product from pressureless sintering that has a sufficiently high concentration of closed porosity that further densification by hot isostatic pressing can be accomplished without the use of an external cladding or encapsulation material around the part subjected to the hot isostatic pressing.

HIPed composites from the present process are useful for fabrication into a variety of elements subject to wear and/or impact where toughness and shock resistance are important characteristics and which have previously been served by ceramics made by hot pressing. Particular applications for the present HIPed composites include, inter alia, drill bits exhibiting cutting edges for graphite composites, plastics, woods, or metals; router bits exhibiting cutting edges for, inter alia, wood, fiberboard, metal, plastics, or laminated composites including graphite composites and wood laminates; cutting tools exhibiting a cutting edge for cutting metals; turbine blades; heat engine components such as engine blocks, pistons, and valves; punches and dies exhibiting surfaces and clearances appropriate for can manufacture or other metal shaping operations; nozzles; roller or ball bearings that may be formed as assemblies in a metal or ceramic race; extrusion dies; and seals, inter alia, pump seals for impellers.

Drill and router bits made from ceramics using the present process exhibit shapes which are the same as those of conventional drill and router bits. These tools are useful for cutting wood, metals, and laminates such as graphite composites and wood laminates. In fact, use of the present ceramic tools for cutting graphite composites will perform like hot pressed ceramic bits which can cut hundreds of holes in graphite composites without delamination. See, Lauder U.S. Pat. No. 5,002,439.

When used for cutting tools, the cutting tools are replaceable inserts of the standard geometry employed in the cutting tool industry for applications including, inter alia, turning, facing, milling, boring, and similar operations. The inserts will exhibit a cutting edge having dimensions and angles appropriate for cutting metal according to the desired cutting technique. As an example, a preferred insert geometry for cutting nickel-based alloys would exhibit an axial rake of −5°, an end cutting edge angle of 15°, a radial rake of −5° with a radial relief of 5°, and a corner angle of 15° with a nose radius of 0.030 inches (0.762 mm). See, Rhodes U.S. Pat. No. 4,961,757 and 4,789,277 which are herein incorporated by reference. Indeed, use of the process permits inserts and tools to be molded in near net final shape without the need for machining larger blanks and the material waste associated therewith.

Can tools made from ceramics produced according to the present process (either before or after HIPing) exhibit a shape of forming wheels, punches and/or dies with smooth outer surfaces and close tolerances between associated dies and punch elements. The whisker reinforced alumina ceramics possess a number of unique advantages in their ability to produce smooth part surfaces for long periods of time without significant buildup of can material on the outer surface of the tool. See, Lauder U.S. Pat. No. 5,095,730.

EXAMPLES

The following examples are useful for describing the benefits of the present invention. In all examples, the alumina was a commercially available α-alumina powder with a density of 3.98±0.02 g/cm² with a purity of at least 99.97%. The surface area of the alumina was 10.5 m²/g. The sintering aids were magnesia and yttria in levels of less than 4%.

The silicon nitride powder was a commercially available mixture of alpha (95.2%) and beta (4.8%) forms having a density of about 3.18 g/cm². The average particle size of the silicon nitride powder was 0.45 μm.

The monocrystalline whiskers used in the examples were silicon carbide whiskers produced from rice hulls. These whiskers before processing have average diameters of about 0.4 to about 0.6 μm and aspect ratios on the order of 15–150. The whiskers had a density of 3.21 g/cm³.

Unless otherwise stated, all percentages are given in terms of weight percent based on total weight.

EXAMPLES 1–5

Examples 1–5 illustrate the effects of a varied silicon nitride powder concentration on a constant whisker concentration of 15%.

Alumina powder, silicon nitride, silicon carbide whiskers, and the sintering aids were weighed and wet ball milled for about 10 hours. An organic binder and a lubricant were then added, and ball milling continued for another 30 minutes. The mixture was then placed in an oven and completely dried at about 70° C. The resulting cake was dry milled for about 16 hours until the material became a homogeneous free-flowing powder exhibiting a particle size distribution substantially in the range from about −40 Tyler mesh (373 to about +325 Tyler mesh (44 μm) with whiskers uniformly distributed therethrough.

Green preform bodies exhibiting disk shapes were prepared by pressing the powder in a cylindrical die having a diameter of 1.125 inches (28.6 mm) and applying an axial pressure of about 10,000 psi. Disks contained 10 grams of powder. The binder material was removed by heating the preform in a muffle furnace at 500° C. in air until all the binder had been burned off. The sample was then ready for pressureless sintering.

Figure 1:
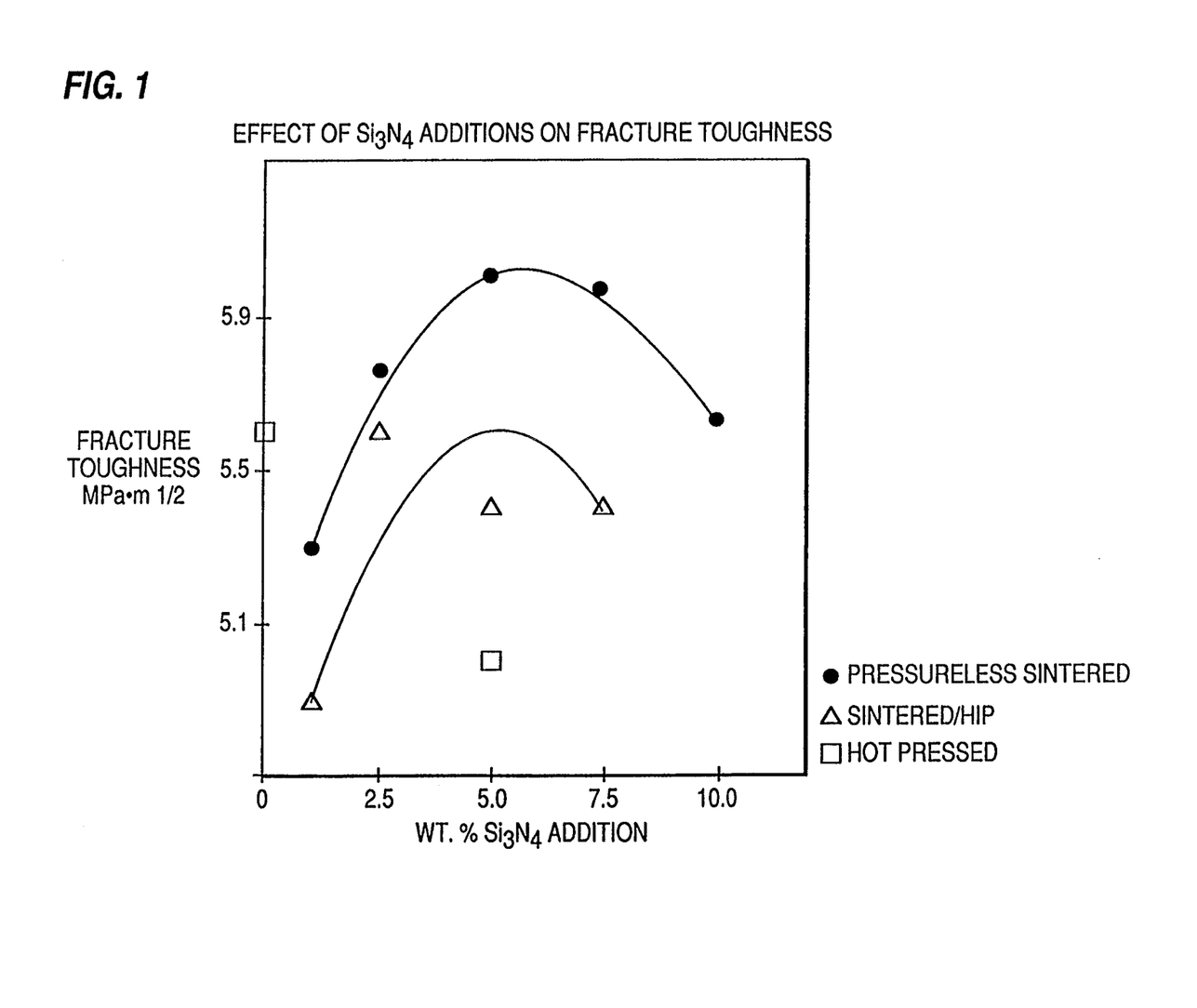
FIG. 1 is a graph depicting the relationships between fracture toughness and silicon nitride content in an alumina matrix reinforced with silicon carbide whiskers.

The pressureless sintering took place in a graphite resistance furnace at 1625° C. with a constant flow of nitrogen through the heating chamber. The preform was held at 1625° C. for 50 minutes and then allowed to cool to room temperature. The resulting sintered disks were checked for density, the degree of closed porosity, and for toughness and hardness using the conventional Vickers Indentation Method with a 10 kg load. The results are reported in Table 1. The relationship between fracture toughness and silicon nitride concentration is illustrated in FIG. 1 for samples prepared by pressureless sintering with and without HIPing and samples prepared by hot pressing.

TABLE 1

Pressureless Sintered Results (Varying Si₃N₄ Content)

| Ex. | $Si_3N_4$ (Wt %) | $SiC_w$ (Wt %) | Green Density (%) | Sintered Density (%) | Open Porosity (vol. %) | Closed Porosity (vol. %) | Hardness (GPa) | Toughness (MPa√m) |
|---|---|---|---|---|---|---|---|---|
| 1 | 1.0 | 15 | 62.5 | 98.8 | — | — | 17.4 | 5.3 |
| 2 | 2.5 | 15 | 64.8 | 95.5 | 0.04 | 4.46 | 15.3 | 5.8 |
| 3 | 5.0 | 15 | 64.9 | 95.9 | 0.08 | 4.02 | 15.5 | 6.0 |
| 4 | 7.5 | 15 | 65.4 | 96.1 | 0.26 | 3.64 | 15.6 | 6.0 |
| 5 | 10.0 | 15 | 60.0 | 94.9 | 0.37 | 4.73 | 16.0 | 5.6 |

Examples 1–5 were then subjected to hot isostatic pressing (HIPing) to make examples 6–10. The properties of the samples after HIPing are reported in Table 2.

TABLE 2

HIPed Results (Varying $Si_3N_4$ Content)

| Ex. | $Si_3N_4$ (Wt %) | SiC (Wt %) | Density (% TD) | Open Porosity (Vol %) | Closed Porosity (Vol %) | Hardness (GPa) | Toughness (MPa√m) |
|---|---|---|---|---|---|---|---|
| 6 | 1.0 | 15 | — | — | — | 19.0 | 4.9 |
| 7 | 2.5 | 15 | 98.5 | 0.13 | 1.37 | 16.7 | 5.6 |
| 8 | 5.0 | 15 | 98.4 | 0.16 | 1.44 | 17.3 | 5.4 |
| 9 | 7.5 | 15 | 98.6 | 0.13 | 1.27 | 17.5 | 5.4 |
| 10 | 10.0 | 15 | 96.5 | 0.87 | 2.64 | Sample Cracked | |

EXAMPLES 11–14

Examples 11–14 maintain the silicon nitride powder concentration at 5% and vary the whisker concentration. The preparation method is otherwise the same as that of examples 1–5. The properties of the resulting sintered samples are presented in Table 3.

TABLE 3

Pressureless Sintered Results (Varying $SiC_w$ Content)

| Ex. | $SiC_w$ (Wt %) | Green Density (% TD) | Sintered Density (% TD) | Open Porosity (Vol %) | Closed Porosity (Vol %) |
|---|---|---|---|---|---|
| 11 | 10 | 65.2 | 98.1 | 0.05 | 1.85 |
| 12 | 15 | 64.9 | 95.9 | 0.08 | 4.02 |
| 13 | 20 | 66.8 | 94.2 | 0.57 | 5.23 |
| 14 | 25 | 67.5 | 88.8 | 0.58 | 10.62 |

EXAMPLE 15

Example 15 was made using the same technique as in examples 1–6 but without binder or lubricant. Examples 11 had 15 wt. % silicon carbide whiskers and 5 wt. % silicon nitride. The sample was hot pressed under nitrogen at 1520° C. and a pressure of 4,000 psi. The resulting composite had the following average properties:

TABLE 4

| | |
|---|---|
| Density | >99% theoretical |
| Hardness (GPa) | 17.3 |
| Fracture toughness (MPa√m) | 5.0 |

The fracture toughness is shown in FIG. 1 for comparison against the samples sintered without supraatmospheric pressure according to the present invention. By comparison, a commercially available hot pressed sample with 15 wt.% silicon whiskers and no silicon nitride had a slightly better toughness of 5.6 MPa√m.

As will be seen from FIG. 1, samples prepared according to the present invention both with and without HIPing have a better toughness than the hot pressed sample of the same composition subjected to hot pressing. The toughness exhibited by samples of the present invention are also comparable to or better than the hot pressed sample without silicon nitride.

EXAMPLES 16-20

Metal cutting tools in the form of inserts were prepared for comparison to commercially available inserts. The inserts of example 3 were pressureless sintered (PSed) and then HIPed as in example 8 to produce a blanks having the shape of disks with a diameter of 1.125 inches (28.6 mm). The blanks were cut to the shape of inserts having the same dimensions and cutting surface preparations as conventional ceramic cutting tool inserts.

The following inserts were prepared:

TABLE 5

| Example | Material |
|---|---|
| 16 | Commercially available insert of silicon carbide whisker reinforced alumina, 25 wt % whiskers made by hot pressing |
| 17 | Insert according to the invention of silicon carbide whisker reinforced alumina containing 5 wt % silicon nitride powder modifier and up to 2% of Mg and Y oxides as sintering aids, 15 wt % whiskers |
| 18 | Commercially available silicon nitride (Sialon) insert generally used in the industry for cutting iron |
| 19 | Commercially available zirconia reinforced alumina insert for cutting iron. |
| 20 | Commercially available coated titanium carbide insert |

Tool life was determined by the first of: (a) fracture; (b) an average flank wear of 0.012 in. (0.30 mm) or greater; (c) a maximum flank wear of 0.017 in. (0.43 mm) or greater; (d) a maximum nose wear of 0.017 in. (0.43 mm) or greater; or (e) a notch wear of 0.79 in. (2 mm) or greater. Having established such standardized wear ranges, the tool life can be used to compare the usefulness of each of the tested tool materials.

EXAMPLE 21

One insert each from examples 16-19 were tested for wear performance by turning nodular ductile iron (295 bnh) on a 60 HP Axis C.N.N. Universal Lathe. No coolant was used. The cutting speed was 900 surface feet per minute (SFPM) (274 SMPM) at a feed rate of 0.015 inches per revolution (0.38 mm per revolution). Each cut was at a depth of 0.10 inches (2.54 mm). Table 6 reports the results.

TABLE 6

| Example | Average Wear (in.) | Maximum Wear (in.) | Nose Wear (in.) | Tool Life (min.) | Failure Mode |
|---|---|---|---|---|---|
| 16 | 0.0250 | 0.0573 | — | 3.75 | Fracture |
| 17 | 0.0125 | 0.0134 | 0.0132 | 4.50 | Wear |
| 18 | 0.0125 | 0.0140 | 0.0114 | 1.00 | Wear |
| 19 | 0.0091 | 0.0170 | 0.0085 | 1.00 | Wear |

EXAMPLE 22

The inserts of examples 16-20 were tested for wear performance by turning nodular ductile iron (295 bnh) on a 60 HP Axis C.N.N. Universal Lathe. No coolant was used. The cutting speed was slower than in Ex. 21, 700 SFPM v. 900 SFPM, at a feed rate of 0.015 inches per revolution (0.38 mm per revolution). Each cut was at a depth of 0.10 inches (2.54 mm). Table 7 reports the results.

TABLE 7

| Example | Average Wear (in.) | Maximum Wear (in.) | Nose Wear (in.) | Tool Life (min.) | Failure Mode |
|---|---|---|---|---|---|
| 16 | 0.0133 | 0.0151 | 0.0138 | 5.0 | Wear |
| 17 | 0.0122 | 0.0156 | 0.0109 | 3.5 | Wear |
| 18 | 0.0124 | 0.0138 | 0.0111 | 1.0 | Wear |
| 19 | 0.0085 | 0.0191 | 0.0042 | 1.0 | Wear |
| 20 | 0.0156 | 0.0270 | 0.0296 | 2.0 | Wear |

EXAMPLE 23

The inserts of examples 16-20 were tested for wear performance by turning G4000 Grey Iron (196 bnh) on a 60 HP Axis C.N.N. Universal Lathe. No coolant was used. The cutting speed was 1500 SFPM at a feed rate of 0.015 inches per revolution (0.38 mm per revolution). Each cut was at a depth of 0.10 inches (2.54 mm). Table 8 reports the results.

TABLE 8

| Example | Average Wear (in.) | Maximum Wear (in.) | Nose Wear (in.) | Tool Life (min.) | Failure Mode |
|---|---|---|---|---|---|
| 16 | 0.0108 | 0.0173 | 0.0104 | 21 | Wear |
| 17 | 0.0096 | 0.0175 | 0.0137 | 21 | Wear |
| 18 | 0.0133 | 0.0174 | 0.0165 | 5 | Wear |
| 19 | 0.0111 | 0.0171 | 0.0163 | 17 | Wear |
| 20 | 0.0099 | 0.0170 | 0.0141 | 18 | Wear |

EXAMPLE 24

The inserts of examples 16-19 were tested for wear performance by turning Inconel 718 (432 bhn) on a 60 HP Axis C.N.N. Universal Lathe. Coolant was used. The cutting speed was 650 SFPM at a feed rate of 0.008 inches per revolution (0.20 mm per revolution). Each cut was at a depth of 0.06 inches (1.52 mm). Table 9 reports the results.

TABLE 9

| Example | Average Wear (in.) | Maximum Wear (in.) | Nose Wear (in.) | Tool Life (min.) | Failure Mode |
|---|---|---|---|---|---|
| 16 | 0.0126 | 0.0193 | 0.0275 | 4.0 | Wear |
| 17 | 0.0131 | 0.0171 | 0.0425 | 5.0 | Wear |
| 18 | 0.0173 | 0.0216 | 0.0569 | 1.0 | Wear |
| 19 | 0.0089 | 0.0113 | 0.1172 | 2.0 | Wear |

EXAMPLE 25

Inserts of Example 17 were ground to form a cutting edge. The inserts have been used successfully in the following operations:
a. Facing stainless steel 304 with a 0.0335 in depth of cut
b. Turning O.D. of a round 4140 steel bar with a depth of cut varying from 0.015 to 0.025 in.
c. Turning O.D. of a round cold rolled 1020 steel bar.

The above were run dry (no lubricant) and exhibited excellent cutting efficiency at high rates of metal removal while exhibiting high wear resistance. An insert of Example 17 that had been formed by the present invention into a near net final shape cutting tool exhibiting a cutting edge but no additional edge preparation, performed similarly to the cutting edge ground insert when the test of Example 25(b) was repeated.

Example 17 inserts that had been edge ground also exhibited high cutting efficiencies and low wear rates when used to cut non-ferrous metals, including copper, brass and aluminum at high surface speeds.

EXAMPLE 26—DRILL AND ROUTER BITS

Samples according to examples 3 were extruded in the form of continuous rods having nominal diameters of 0.25 inches (6.35 mm) and 0.5 inches (12.7 mm) for formation into drill and router bits, respectively. Samples of each diameter were cut into rods having a nominal 4 inch (10.2 cm) length. The rods were then HIPed in accordance with Example 8 and surface ground with conventional equipment to final precise diameters of 0.25 inches (6.35 mm) for the drill bit samples and 0.5 inches (12.7 mm) for the router bits. The finished samples had an average density of 98.1% of theoretical and all samples exhibited the conventional geometry and cutting edge preparations for each type of tool.

The whisker-reinforced drill bits made by the process of the invention were tested in a side-by-side comparison against conventional tungsten carbide drill bits having the same geometry and edge preparation for drilling holes in fiberglass laminates and carbon fiber laminates. The whisker-reinforced bits formed clean holes with no visible evidence of delamination.

The whisker-reinforced router bits made by the process of the invention were tested against a conventional tungsten carbide router bit for high speed (3,000–4,000 rpm) routing performance on wood, particle board, medium density fiberboard, plywood, and plastic laminate-covered plywood (i.e., Formica TM). The router bits exhibited the same geometry and edge preparation.

In all cases, the whisker-reinforced router bit of the invention removed material rapidly with sharp, clean, uniform profiles. The samples shaped with the whisker-reinforced tools exhibited no burning of the shaped edge. The whisker-reinforced tools exhibited no adhesive buildup of resin from the shaped samples.

In contrast, samples shaped with the conventional tungsten carbide bit exhibited edge burn marks due to the friction at the cutting interface. The conventional tungsten carbide bits also exhibited adhesive buildup when cutting laminates such as plywood.

It will be understood that the examples presented herein are for illustration purposes and are not intended to act as limitations on the scope of the appended claims.

We claim:

1. A process for making a sintered composite body comprising:
sintering under pressureless sintering conditions a preform body having a density within the range from about 60% to about 70% of theoretical maximum and made from a mixture comprising: a matrix consisting essentially of alumina and up to about 4 wt. % of sintering aids, about 10 to about 20 wt. % of monocrystalline whiskers, and about 2 to about 7.5 wt.% of nitride modifier consisting essentially of silicon nitride or aluminum nitride or mixtures thereof, to provide a sintered Ceramic composite which exhibits a density of at least about 95% of theoretical and a sufficiently high density and concentration of closed pores to achieve a density of at least about 98% theoretical upon densification by hot isostatic pressing.

2. A process according to claim 1 wherein the sintering is conducted with a preform body having a nitride modifier consisting essentially of silicon nitride.

3. A process according to claim 1 wherein the sintering is conducted with a preform body having a whisker selected from the group consisting of alumina, titanium carbide, silicon carbide, and mixtures thereof.

4. A process according to claim 3 wherein the sintering is conducted with a preform body having a silicon carbide whisker content within the range from about 10 wt. % to about 18 wt. %.

5. A process according to claim 4 wherein the sintering is conducted with a preform body having a silicon carbide whisker content of about 10-15 wt. %.

6. A process according to claim 5 wherein the sintering is conducted with a preform body having a nitride modifier content within the range from about 3.5 wt. % to about 6 wt. %.

7. A process according to claim 6 wherein the sintering is conducted with a preform body having a nitride modifier content within the range from about 4 wt. % to about 5.5 wt. %.

8. A process according to claim 1 further comprising before the sintering step:
forming a preform body having a density within the range from about 60% to about 70% of theoretical by a process consisting essentially of:
thoroughly mixing said alumina, the sintering aids, said nitride modifier, and said whiskers; and
forming the mixture into said preform body.

9. A process according to claim 8 further comprising:
shaping said preform body into a shape approximating a final shape with allowance for shrinkage of the shaped preform body upon sintering.

10. A process according to claim 9 further comprising:
shaping said preform body into a drill bit, a router bit, a cutting tool, a turbine blade, heat engine components, a punch, a die, a nozzle, a roller, a ball bearing, a roller bearing, an extrusion die, or a pump seal.

11. A process according to claim 1 further comprising:
subjecting the sintered preform body to hot isostatic pressing to produce a compacted ceramic body having a density of at least about 98% of theoretical.

12. A process according to claim 1 wherein the sintering is conducted with a preform body consisting essentially of a matrix consisting essentially of alumina, at least one sintering aid, silicon carbide whiskers, and silicon nitride.

13. A process according to claim 12 wherein the sintering is conducted with a mixture of sintering aids.

14. A process according to claim 12 wherein the sintering is conducted magnesia and yttria as sintering aids.

15. A composite comprising a sintered ceramic matrix consisting essentially of alumina and up to about 4 wt. % of sintering aids, about 10 to about 20 wt. % monocrystalline whiskers, and about 2 to about 7.5 wt.% of nitride modifier consisting essentially of silicon nitride or aluminum nitride or mixtures thereof, wherein said sintered ceramic composite exhibits a density of at least about 95% of theoretical and a closed pore structure that will permit a further density increase to at least about 98% of theoretical by hot isostatic pressing.

16. A composite as in claim 15 which is further pressed by hot isostatic pressing.

17. A composite as in claim 15 wherein said whiskers are present within the range from about 10 wt.% to about 18 wt.%.

18. A composite as in claim 15 wherein said whiskers are selected from the group consisting of alumina, titanium carbide, silicon carbide, and mixtures thereof.

19. A composite as in claim 18 wherein said whiskers consist essentially of silicon carbide.

20. A composite as in claim 15 wherein said nitride modifier consists essentially of silicon nitride powder.

21. A composite as in claim 15 wherein said sintering aids contain a mixture of magnesia and yttria.

22. A composite as in claim 21 wherein said at least one sintering aid comprises up to about 2 wt. % of a mixture of yttria and magnesia.

23. A composite of claim 15 which exhibits the shape of a forming wheel, die, or punch.

24. A sintered ceramic composite comprising a matrix consisting essentially of alumina and up to about 4 wt. % sintering aids, about 10 to about 20 wt. % monocrystalline whiskers, and about 2 to about 7.5 wt. % of nitride modifier consisting essentially of silicon nitride or aluminum nitride or mixtures thereof, wherein said composite exhibits a density of at least about 95% of theoretical and a closed pore structure that will permit a further density increase by hot isostatic pressing wherein said sintered ceramic composite is made by a process comprising:

sintering under pressureless sintering conditions a preform body having a density within the range from about 60% to about 70% of theoretical maximum and made from a mixture comprising a matrix consisting essentially of alumina and up to about 4 wt. % sintering aids, about 10 to about 20 wt. % of monocrystalline whiskers, and about 2 to about 7.5 wt. % of nitride modifier consisting essentially of silicon nitride or aluminum nitride or mixtures thereof wherein the sintered ceramic composite has a sufficiently high density and concentration of dosed pores to achieve a density of at least about 98% theoretical upon hot isostatic pressing;

pressing said composite by hot isostatic pressure to provide a sintered ceramic product having a density of at least about 98% theoretical, a fracture toughness of at least about 5 MPa$\sqrt{m}$ and a bending strength of at least about 500 MPa.

25. A composite of claim 24 which exhibits a cutting tool having a cutting edge for metal.

26. A composite of claim 24 which exhibits the shape of a forming wheel, die or punch.

27. A composite as in claim 26 which exhibits the shape of a die or a punch.

* * * * *